June 19, 1956  O. H. GRISWOLD  2,750,766
ANGULAR TRANSMISSION FOR SHAFTS
Filed Jan. 21, 1954  2 Sheets-Sheet 1
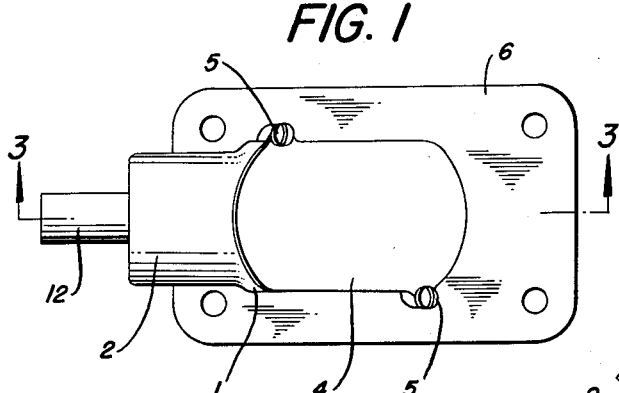
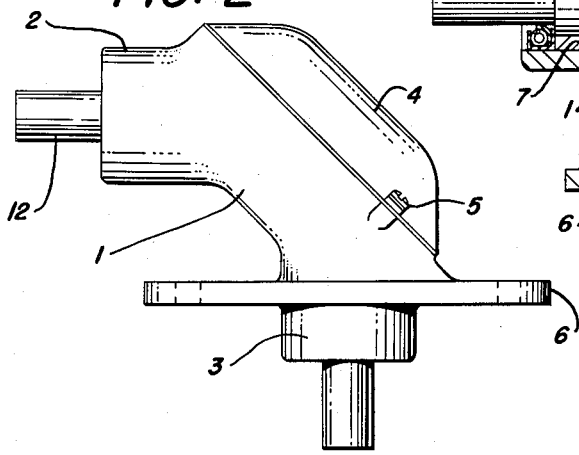
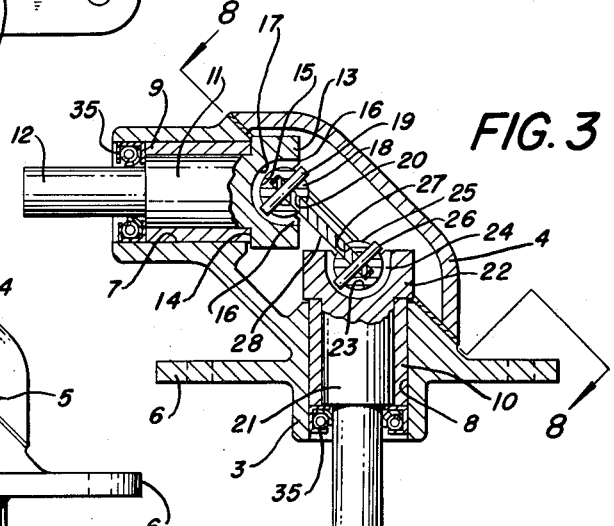
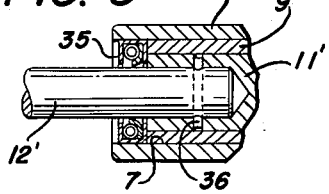
INVENTOR.
BY OWEN H. GRISWOLD
ATTORNEYS June 19, 1956  O. H. GRISWOLD  2,750,766
ANGULAR TRANSMISSION FOR SHAFTS Filed Jan. 21, 1954  2 Sheets-Sheet 2

INVENTOR.
OWEN H. GRISWOLD
BY
*Isler and Ornstein*
ATTORNEYS

United States Patent Office 2,750,766
Patented June 19, 1956

2,750,766

ANGULAR TRANSMISSION FOR SHAFTS

Owen H. Griswold, Paramus, N. J.

Application January 21, 1954, Serial No. 405,482

1 Claim. (Cl. 64—6)

This invention relates, as indicated, to an angular transmission for shafts.

Various means have heretofore been devised for transmitting power between two shaft ends at right angles, but each has been deficient in one or more of the four requirements for such a transmission, which include positive motion, flexibility, compactness and quietness of action.

In one type of angle drive, spiral bevel gears are employed in a blind housing unit. Such units are expensive because the gears, themselves, are expensive. Moreover, the production of such gears is limited, because they are made on machine tools having a fixed hourly rate of production, so that in the event of a national emergency, production could only be increased by building more of the specialized machine tools required for the production of these gears.

Another disadvantage in the use of gears of such angle drives resides in the fact that assembly of the gear unit requires shimming of each shaft in two directions axially, as well as accurate assembly of the shafts to each other, also by shimming, in order that the gears may be properly aligned in the blind housing. Failures have occurred where the gears were not properly aligned, and the loads thereby concentrated on the ends of the gear teeth. In aircraft installations, in particular, which require a maximum of 0°—45' backlash, shimming is a critical and expensive operation.

The line contact of the gear teeth, where gears are employed in angle drives, imposes the loads on relatively small areas, which weakens the unit as a whole.

The present invention has as its primary object the provision of an angular transmission for shafts which not only meets all of the essential requirements for such transmissions, but which, at the same time, overcomes all of the disadvantages in angle drives utilizing gears which have been described.

Another object of the invention is to provide an angle drive or angular transmission which consists of a minimum number of parts which can be mass-produced, easily and quickly assembled, and sold at a relatively low price.

Other objects and advantages of my invention will be apparent during the course of the following description.

In the accompanying drawings, forming a part of this specification, and in which like numerals are employed to designate like parts throughout the same, Fig. 1 is a top plan view of a transmission unit embodying the invention;

Fig. 2 is a side elevational view of the unit;

Fig. 3 is a cross-sectional view, taken on the line 3—3 of Fig. 1;

Fig. 4 is a view similar to Fig. 3, but showing the internal mechanism rotated at an angle of 90 degrees from the position shown in Fig. 3;

Fig. 5 is a fragmentary view, similar to Fig. 4, but showing a slight modification;

Figure 6:
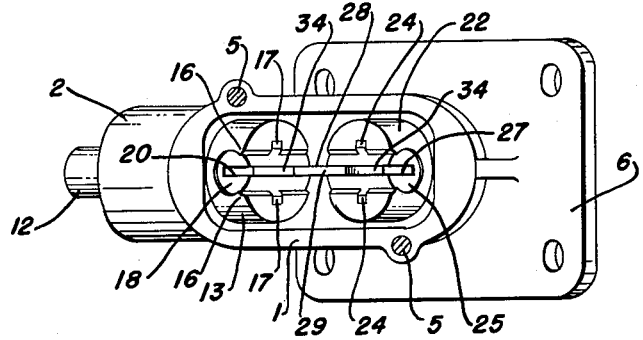
Fig. 6 is a cross-sectional view, taken on the line 6—6 of Fig. 4.

Referring more particularly to Figs. 1 to 4, 6, 7 and 8 of the drawings, the transmission will be seen to comprise an elbow-like housing in the form of a casting 1 having branches 2 and 3 extending at right angles to each other.

The housing is adapted to be closed by means of a cover or cover plate 4, which is removably secured to the housing by means of screws or bolts 5. The housing is also provided with a flange 6, formed integrally therewith, whereby the transmission may be attached to apparatus in connection with which it is designed to be used.

The branches 2 and 3 have axial openings 7 and 8 respectively.

Mounted in the openings 7 is a bearing 9 which may be a needle bearing, or a sleeve bearing made of nylon, aluminum-bronze, or a sintered, powdered metal. A similar bearing 10 is mounted in the opening 8.

Journalled for rotation in the bearing 9 is a shaft 11 having an extension 12 of reduced diameter, which projects from the branch 2, and a head 13 at its inner end, of enlarged diameter. The head 13 forms an annular thrust shoulder 14 with the shaft 11, which shoulder bears against the inner end of the bearing 9, so as to preclude displacement of the shaft outwardly from the branch 2.

The head 13 has a recess 15 extending diametrically therethrough which recess is of arcuate cross-section, extending through an angle which is somewhat greater than 180 degrees, so as to form portions or ledges 16 which overhang the open side of said recess, and which serve a purpose to be presently described. A slot or groove 17 is also formed in the head 13, centrally of the length of the recess, this slot or groove being made by plunging a Woodruff cutter axially into the shaft head 13 so that the slot has an arcuate portion extending 180 degrees, with its center coincidental with the axis of the recess 15, and short straight portions extending from the ends of the arcuate portion to the inner face of the shaft head.

Journalled for rotation or oscillatory movement in the recess 15 is a cylindrical rocker 18, preferably formed of bronze, the rocker being maintained against displacement in an axial direction from the head 13 by the overhanging ledges 16 which partially envelop the rocker. The rocker is somewhat shorter in length than the diameter of the head 13. A pin 19, of a diameter approximately the same as the width of the slot 17 extends diametrically through the rocker 18, midway of the length of the rocker and has projecting ends which extend into the slot 17. The pin 19 is pressed into the rocker, and extends through a slot 20 which is milled diametrically into the rocker and extends the full length of the rocker.

Journalled for rotation in the bearing 8 is a shaft 21, which is similar in all respects to the shaft 11, having a head 22 provided with a recess 23 and a slot or groove 24. A rocker 25 is journalled for rotation or oscillatory movement in the recess 23, the rocker having a pin 26 which extends diametrically through the rocker midway of the length of the rocker, and has projecting ends which extend into the slot 24. The pin 26 extends through a slot 27 which is milled diametrically into the rocker and extends the full length of the rocker.

A flat link 28 of hardened steel is interposed between the rockers 18 and 25. This link has parallel upper and lower edges 29 and 30, and is provided with circular openings 31 and 32, through which the pins 19 and 26 respectively extend, so that the link is, in effect, pivoted to the rockers by means of these pins. The end portions of the link 28 have a slide fit in the slots 20 and 27 of the rockers. The link is provided with ends 33 which, through an arc of approximately 90 degrees, are concentric with the centers of the openings 31 and 32, and is also provided with inclined straight end surfaces 34 which extend from the ends of the end surfaces 33 to the ends of the edges 29 and 30.

Cartridge type seals 35 may be provided in the outer ends of the openings 7 and 8.

If desired, and as shown in Fig. 5, the shaft may be formed in two pieces 11' and 12', with a pin 36 interconnecting them. This construction is desirable where units with long shaft extensions are to be manufactured.

Figure 7:
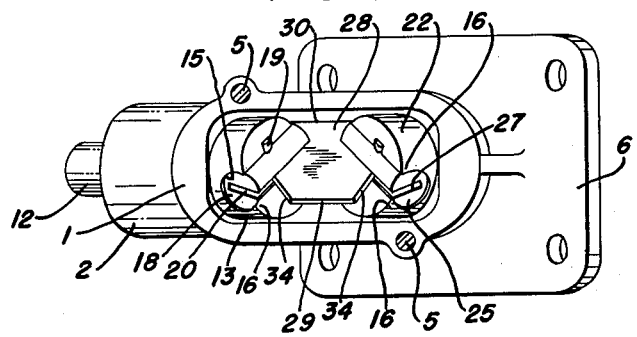
Fig. 7 is a view similar to Fig. 6, but with the parts rotated 45 degrees from the position shown in Fig. 6.

With the foregoing construction in mind, the operation of the device may now be briefly described, as follows:

Assuming that the parts are in the position shown in Figs. 4 and 6, rotation of the shaft extension 12 through an angle of 45 degrees in a clockwise direction, as viewed from the left-end of the extension 12 in Fig. 6, causes a corresponding movement of all of the parts to the position shown in Fig. 7. During this movement the rocker 18 rotates in a clockwise direction about its axis, as viewed from the end of the rocker closest to the observer in Fig. 7, so as to partially expose the upper end of the pin 19. At the same time, the link 29 is moved by the rocker 18 through an angle of 45 degrees toward the observer, to the position shown in Fig. 7. Moreover, the link 29 causes the rocker 25 to be rotated in a counterclockwise direction about its axis, as viewed from the end of the rocker closest to the observer in Fig. 7, so as to partially expose the upper end of the pin 26. The movement of the rocker 25 to the position shown in Fig. 7 causes a rotation of the shaft 21 in the same direction as the shaft 11 and through the same arc, i. e., 45 degrees.

Figure 8:
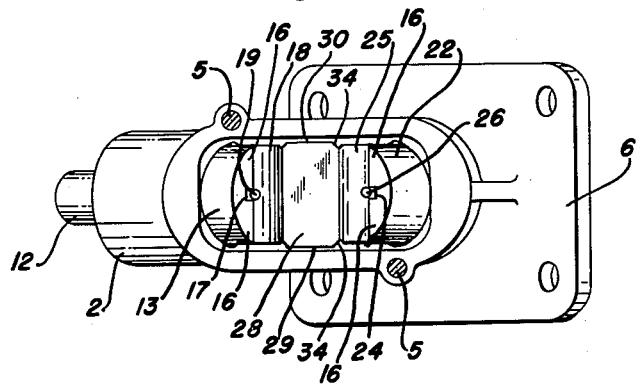
Fig. 8 is a view similar to Fig. 6, but with the parts rotated 90 degrees from the position shown in Fig. 6.

Rotation of the shaft extension 12 through an angle of 45 degrees, in a clockwise direction, as viewed from the left end of the extension 12 in Fig. 6, from the position shown in Fig. 7 to the position shown in Fig. 8, causes a corresponding movement of all of the parts, including the rocker 18, link 28, rocker 25 and shaft 21, to the position shown in Fig. 8.

Continued rotation of the shaft extension 12 from the position shown in Fig. 8 causes a corresponding rotation of the shaft 21, but at this point, and for the next 180 degrees of rotation, the direction of rotation of the rockers 18 and 25 about their axes is reversed, these rockers changing their direction of rotation at the end of each 180 degrees thereafter.

The unit which has been described is useful for numerous purposes, among which may be mentioned its use in the fuel system of an airplane, between the fuel selector valve and the valve operating handle located in the cockpit. A fuel selector valve connects the various fuel tanks in an airplane with the fuel line to the engine or turbine, and torsional shafting is used from the valve to the angular transmissions or "angle drives" and to the handle. Its use, however, is not confined to this application or to manual rotation, as units have been run at speeds of 1000 R. P. M. Another use for the unit is to operate an antenna loop or any control.

Essentially, the unit consists of two universal joints and bearings in a right angle housing. It may be noted at this point, that the shafts maintain an exact angular relationship between each other during rotation because the acceleration between a shaft and the link is balanced by an equivalent negative acceleration between the link and the other shaft.

The unit has a number of distinct advantages over similar units employing gears therein. Gears, in themselves, are expensive. Spiral bevel gears, heretofore used, are made on Gleason machines at a fixed rate per hour. In the event of a national emergency, production could only be increased by first building more gear cutting machines. The present transmission unit can be produced in as large quantities as desired, without special machine tools.

In angle drives employing gears in their construction, assembly of the gear unit requires shimming of each shaft in two directions axially. It also requires accurate assembly of the shafts to each other, also by shimming, in order that the gears be properly aligned in the blind housing. Many failures have occurred because the gears were not properly aligned, thereby concentrating the loads on the end of the gear tooth. Since aircraft installations require a maximum of 0°—45' backlash, this shimming is a critical and expensive one. The present unit does not require shims, and is assembled through the cover opening in the housing.

In the present unit, the loads are carried on bearings or journals of large area, as compared with the line contact of gear teeth. The unit is therefore stronger statically and dynamically for a given size and weight.

By changing the shape or form of the housing, the same or slightly modified mechanisms, can be used for any angle from 0° to 90°, so that the unit is well adapted for a drive or transmission at various angles.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

In an angular transmission of the character described having branches extending therefrom at an angle of 90° to each other, a removable wall for said casing extending between the said branches and enclosing the transmission, said branches having bearings formed therein, shafts journalled in said branches having enlarged portions engaging said bearings and reduced portions extending from said branches and forming shoulders between said portions, seals in said branches engaging said shoulders and bearing against the reduced portions of the shafts to prevent leakage from said casing, said shafts having recesses at their inner ends having cylindrical walls, said walls having arcuate slots formed therein intermediate the ends of the recesses, said cylindrical walls extending through an arc of more than 180° and said slots being concentric with said cylindrical walls, and means for interconnecting said shafts to establish driving connection therebetween, said means comprising cylindrical rockers journalled in said recesses and extending throughout substantially the entire length of said recesses so as to be confined against axial removal from said recesses by said casing, said rockers having slots milled diametrically therein and extending the entire length of said rockers, pins carried by said rockers and having projecting ends extending into said slots to further insure against axial displacement of said rockers from said recesses, said pins extending across said milled slots, a polygonal link plate having end portions pivoted to the portions of said pins which extend across said milled slots and having slide fits in said milled slots, said plate having opposed flat side edges and converging end portions presenting flat edges which parallel the walls of the recesses when said last mentioned edges have reached their maximum movement toward said cylindrical walls.

References Cited in the file of this patent

UNITED STATES PATENTS

| | | |
|---|---|---|
| 549,144 | Mannesmann | Nov. 5, 1895 |
| 706,403 | Follett | Aug. 5, 1902 |
| 719,611 | Robinson et al. | Feb. 3, 1903 |
| 881,958 | Robinson | Mar. 17, 1908 |
| 1,232,600 | Peck | July 10, 1917 |